United States Patent
He et al.

(10) Patent No.: US 12,197,640 B2
(45) Date of Patent: Jan. 14, 2025

(54) IMAGE GAZE CORRECTION METHOD, APPARATUS, ELECTRONIC DEVICE, COMPUTER-READABLE STORAGE MEDIUM, AND COMPUTER PROGRAM PRODUCT

(71) Applicant: Tencent Technology (Shenzhen) Company Limited, Guangdong (CN)

(72) Inventors: Keke He, Shenzhen (CN); Zhengkai Jiang, Shenzhen (CN); Jinlong Peng, Shenzhen (CN); Yang Yi, Shenzhen (CN); Xiaoming Yu, Shenzhen (CN); Juanhui Tu, Shenzhen (CN); Yi Zhou, Shenzhen (CN); Yabiao Wang, Shenzhen (CN); Ying Tai, Shenzhen (CN); Chengjie Wang, Shenzhen (CN); Jilin Li, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 178 days.

(21) Appl. No.: 17/977,646

(22) Filed: Oct. 31, 2022

(65) Prior Publication Data
US 2023/0049533 A1 Feb. 16, 2023

Related U.S. Application Data

(63) Continuation of application No. PCT/CN2022/072371, filed on Jan. 17, 2022.

(30) Foreign Application Priority Data

Jan. 22, 2021 (CN) .......................... 202110088338.7

(51) Int. Cl.
*G06V 40/16* (2022.01)
*G06F 3/01* (2006.01)
(Continued)

(52) U.S. Cl.
CPC .............. *G06F 3/013* (2013.01); *G06V 10/46* (2022.01); *G06V 10/761* (2022.01); *G06V 10/803* (2022.01); *G06V 40/193* (2022.01)

(58) Field of Classification Search
CPC ........ G06F 3/013; G06F 18/214; G06F 18/25; G06V 10/46; G06V 10/761; G06V 10/803;
(Continued)

(56) References Cited

U.S. PATENT DOCUMENTS

| 2013/0222644 | A1* | 8/2013 | Son | G06F 3/013 |
| | | | | 348/239 |
| 2016/0323540 | A1* | 11/2016 | Nilsson | G06V 20/46 |

(Continued)

FOREIGN PATENT DOCUMENTS

| CN | 110022753 A | 7/2019 |
| CN | 111008929 A | 4/2020 |
| CN | 111353336 A | 6/2020 |
| CN | 112733794 A | 4/2021 |
| JP | 2009-276848 A | 11/2009 |

OTHER PUBLICATIONS

Chinese Office Action for 202110088338.7 dated Jul. 23, 2021.
(Continued)

*Primary Examiner* — John R Schnurr
(74) *Attorney, Agent, or Firm* — Sughrue Mion, PLLC

(57) ABSTRACT

An image gaze correction method, apparatus, electronic device, computer-readable storage medium, and computer program product related to the field of artificial intelligence technologies are provided. The image gaze correction method includes: acquiring an eye image from an image; performing feature extraction processing on the eye image to
(Continued)

obtain feature information of the eye image; performing, based on the feature information and a target gaze direction, gaze correction processing on the eye image to obtain an initially corrected eye image and an eye contour mask; performing, by using the eye contour mask, adjustment processing on the initially corrected eye image to obtain a corrected eye image; and generating a gaze corrected image based on the corrected eye image.

19 Claims, 7 Drawing Sheets

(51) Int. Cl.
*G06V 10/46* (2022.01)
*G06V 10/74* (2022.01)
*G06V 10/80* (2022.01)
*G06V 40/18* (2022.01)

(58) Field of Classification Search
CPC .. G06V 40/193; G06V 40/165; G06V 40/171; G06V 40/18; G06V 40/19; G06T 11/60
See application file for complete search history.

(56) References Cited

U.S. PATENT DOCUMENTS

| | | | |
|---|---|---|---|
| 2016/0323541 A1* | 11/2016 | Nilsson | G06V 40/171 |
| 2017/0308734 A1* | 10/2017 | Chalom | G06V 40/193 |
| 2018/0089834 A1* | 3/2018 | Spizhevoy | G06T 7/194 |
| 2019/0266701 A1* | 8/2019 | Isikdogan | G06V 10/82 |
| 2022/0207667 A1* | 6/2022 | Huang | G06V 40/171 |
| 2023/0054515 A1* | 2/2023 | Peng | G06F 3/013 |
| 2023/0072627 A1* | 3/2023 | Jiang | G06V 40/171 |
| 2023/0186425 A1* | 6/2023 | Lu | G06T 3/60 |
| | | | 348/14.02 |

OTHER PUBLICATIONS

International Search Report for PCT/CN2022/072371 dated Mar. 18, 2022.
Written Opinion for PCT/CN2022/072371 dated Mar. 18, 2022.
Extended European Search Report issued May 22, 2024 in Application No. 22742119.5.
Harsimran KAUR, et al., "EyeGAN: Gaze-Preserving, Mask-Mediated Eye Image Synthesis", IEEE, 2020, pp. 299-308.

* cited by examiner

Image 41    Image 42

Image 51    Image 52    Image 53

IMAGE GAZE CORRECTION METHOD, APPARATUS, ELECTRONIC DEVICE, COMPUTER-READABLE STORAGE MEDIUM, AND COMPUTER PROGRAM PRODUCT

CROSS-REFERENCE TO RELATED APPLICATION(S)

This application is a continuation application of International Application No. PCT/CN2022/072371, filed Jan. 17, 2022, which claims priority to Chinese patent application No. 202110088338.7, filed on Jan. 22, 2021, the disclosures of which are herein incorporated by reference in their entireties.

FIELD

The disclosure relates to the field of artificial intelligence technologies, and relates to an image gaze correction method, apparatus, electronic device, computer-readable storage medium, and computer program product.

BACKGROUND

Gaze correction of an object such as a person and an animal in an image is an application of artificial intelligence in graph and image processing, and has various application scenarios.

Generally, gaze correction is achieved based on deformation of triangular facets. First, a plurality of registration points on an eye contour are obtained by image recognition, and then an eye region is divided into a plurality of triangular regions based on the plurality of registration points, and a plurality of triangular facets are obtained. Then, deformation processing such as stretching is performed on the plurality of triangular facets, so as to achieve gaze correction by adjusting an opening degree of eyes.

However, in the above process of achieving gaze correction based on the deformation of the triangular facets, when gaze directions of the eyes are deviated sideway (e.g., left or right direction), the accuracy of gaze correction is low, resulting in a poor gaze correction effect.

SUMMARY

An image gaze correction method, apparatus, electronic device, computer-readable storage medium, and computer program product are provided in embodiments of the disclosure, which may improve the accuracy of gaze correction.

An image gaze correction method is provided in an embodiment of the disclosure, the method is performed by an electronic device, and the method includes:
  acquiring an eye image from an image;
  performing feature extraction processing on the eye image to obtain feature information of the eye image;
  performing, based on the feature information and a target gaze direction, gaze correction processing on the eye image to obtain an initially corrected eye image and an eye contour mask, the target gaze direction being a gaze direction to which an eye gaze in the eye image is to be corrected, and the eye contour mask being used for indicating a probability that a pixel position in the eye image belongs to an eye region;
  performing, by using the eye contour mask, adjustment processing on the initially corrected eye image to obtain a corrected eye image; and
  generating a gaze corrected image based on the corrected eye image.

A method for training a gaze correction model is provided in an embodiment of the disclosure, the method is performed by an electronic device, and the method includes:
  acquiring a training sample of a gaze correction model to-be-trained, the training sample including an eye image sample and a target corrected eye image;
  performing, by the gaze correction model to-be-trained, gaze correction processing on the eye image sample, the target corrected eye image, and a target gaze direction sample to obtain an initially corrected eye image sample and an eye contour mask sample, the target gaze direction sample being a gaze direction to which an eye gaze in the eye image sample is to be corrected, and the eye contour mask sample being used for indicating a probability that a pixel position in the eye image sample belongs to an eye region;
  performing, by using the eye contour mask sample, adjustment processing on the initially corrected eye image sample to obtain a corrected eye image sample; and
  determining, based on the corrected eye image sample and the target corrected eye image, a loss of the gaze correction model to-be-trained, and adjusting a parameter of the gaze correction model to-be-trained based on the loss to obtain a gaze correction model.

An image gaze correction apparatus is provided in an embodiment of the disclosure, and the apparatus includes at least one memory configured to store program code; and at least one processor configured to read the program code and operate as instructed by the program code, the program code including:
  eye image acquisition code is configured to cause the at least one processor to acquire an eye image from an image;
  feature information extraction code is configured to cause the at least one processor to perform feature extraction processing on the eye image to obtain feature information of the eye image;
  gaze correction processing code is configured to cause the at least one processor to perform, based on the feature information and a target gaze direction, gaze correction processing on the eye image to obtain an initially corrected eye image and an eye contour mask, the target gaze direction being a gaze direction to which an eye gaze in the eye image is to be corrected, and the eye contour mask being used for indicating a probability that a pixel position in the eye image belongs to an eye region;
  image adjustment processing code is configured to cause the at least one processor to perform, by using the eye contour mask, adjustment processing on the initially corrected eye image to obtain a corrected eye image; and
  eye image integration code is configured to cause the at least one processor to generate a gaze corrected human face image based on the corrected eye image.

An apparatus for training a gaze correction model is provided in an embodiment of the disclosure, and the apparatus includes at least one memory configured to store program code; and at least one processor configured to read the program code and operate as instructed by the program code, the program code including:
  sample acquisition code is configured to cause the at least one processor to acquire a training sample of a gaze correction model to-be-trained, the training sample including an eye image sample and a target corrected eye image;

model processing code is configured to cause the at least one processor to perform, by the gaze correction model to-be-trained, gaze correction processing on the eye image sample, the target corrected eye image, and a target gaze direction sample to obtain an initially corrected eye image sample and an eye contour mask sample, the target gaze direction sample being a gaze direction to which an eye gaze in the eye image sample is to be corrected, and the eye contour mask sample being used for indicating a probability that a pixel position in the eye image sample belongs to an eye region;

image adjustment code is configured to cause the at least one processor to perform, by using the eye contour mask sample, adjustment processing on the initially corrected eye image sample to obtain a corrected eye image sample; and parameter adjustment code is configured to cause the at least one processor to determine, based on the corrected eye image sample and the target corrected eye image, a loss of the gaze correction model to-be-trained, and adjust a parameter of the gaze correction model to-be-trained based on the loss to obtain a gaze correction model.

An electronic device is provided in an embodiment of the disclosure, including a processor and a memory. The memory stores at least one instruction, at least one program, a code set, or an instruction set, and the at least one instruction, the at least one program, the code set, or the instruction set is loaded and executed by the processor to implement the image gaze correction method according to the embodiments of the disclosure, or implement the method for training a gaze correction model according to the embodiments of the disclosure.

A non-transitory computer-readable storage medium is provided in an embodiment of the disclosure, storing at least one instruction, at least one program, a code set, or an instruction set, and the at least one instruction. The at least one program, the code set, or the instruction set is loaded and executed by a processor to implement the image gaze correction method according to the embodiments of the disclosure, or implement the method for training a gaze correction model according to the embodiments of the disclosure.

A computer program product or a computer program is provided in an embodiment of the disclosure. The computer program product or the computer program includes computer instructions, and the computer instructions are stored in a non-transitory computer-readable storage medium. A processor of an electronic device reads the computer instructions from the computer-readable storage medium, and executes the computer instructions, causing the electronic device to perform the image gaze correction method according to the embodiments of the disclosure, or perform the method for training a gaze correction model according to the embodiments of the disclosure.

BRIEF DESCRIPTION OF THE DRAWINGS

To describe the technical solutions of the embodiments of the disclosure more clearly, the following briefly introduces the accompanying drawings required for describing the embodiments of the disclosure. Apparently, the accompanying drawings in the following description show only some embodiments of the disclosure, and a person of ordinary skill in the art may still derive other accompanying drawings from these accompanying drawings without creative efforts.

DETAILED DESCRIPTION

Figure 1:
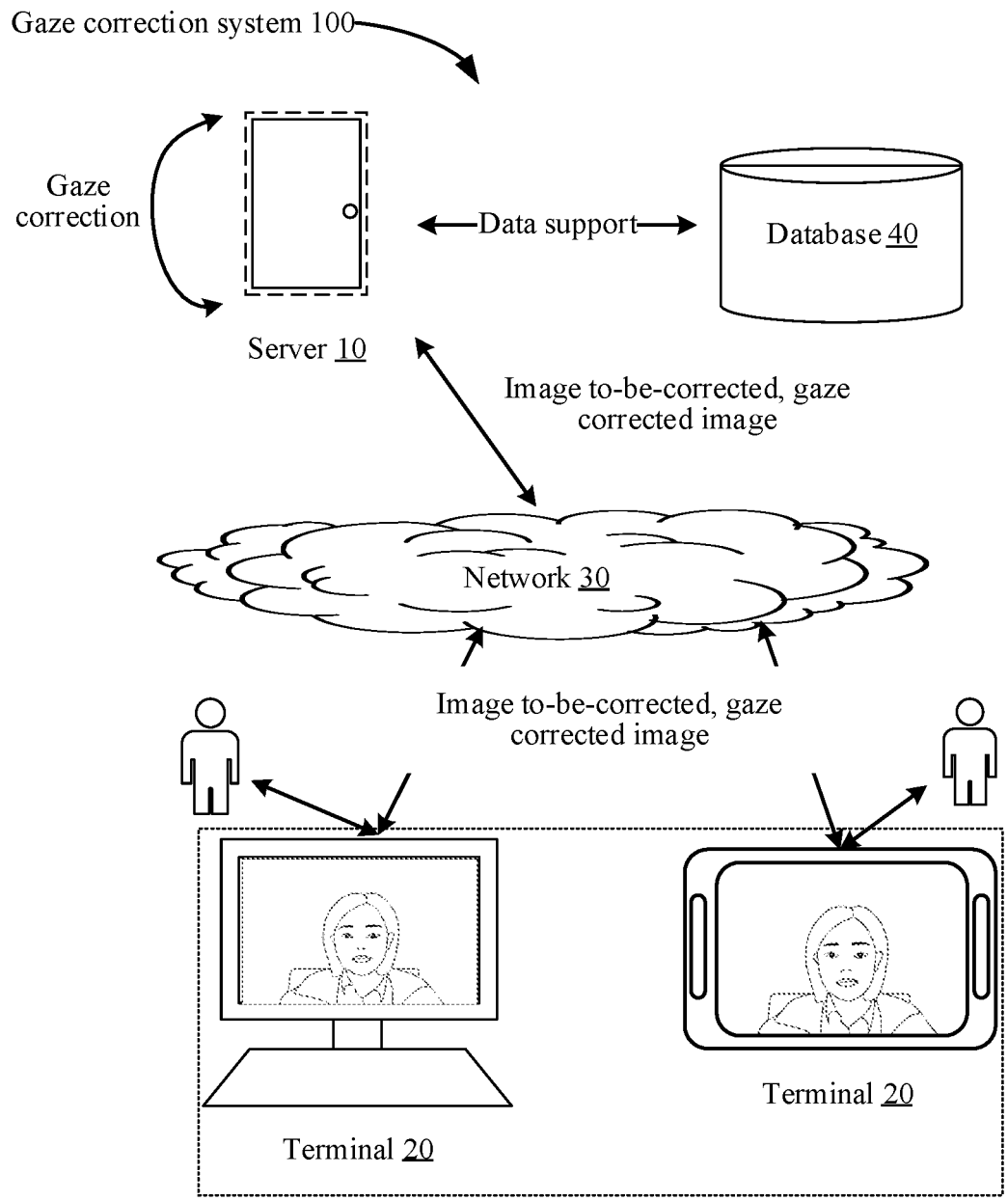
FIG. 1 is a schematic diagram of a solution implementation environment according to an embodiment of the disclosure.

To make objectives, technical solutions, and advantages of the disclosure clearer, the following further describes in detail implementations of the disclosure with reference to the accompanying drawings.

Before example embodiments of the disclosure are described in detail, a description is made on nouns and terms in the embodiments of the disclosure, and the nouns and terms in the embodiments of the disclosure are applicable to the following explanations.

1) Artificial intelligence (AI) is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology is used for determining the essence of intelligence and produce a new intelligent machine that may react in a manner similar to human intelligence. AI is to study the design principles and implementation methods of various intelligent machines, so that the machines may perceive, infer, and make decisions.

It should be further noted that the AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes several major fields such as a computer vision (CV) technology, a speech processing technology, a natural language processing technology, and machine learning (ML)/deep learning (DL).

2) The CV technology is a science that studies how to use a machine to "see", and that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that may obtain information from images or multi-dimensional data. The CV technologies generally include technologies such as image processing, image recognition, image semantic understanding (ISU), image retrieval, optical character recognition (OCR), video processing, video semantic understanding, video content/behavior recognition, three-dimensional object reconstruction, a three-dimensional (3D) technology, virtual reality, augmented reality, synchronous positioning, and map construction, and further include biological feature recognition technologies such as common face recognition and fingerprint recognition.

3) ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, so as to keep improving its performance. ML is a core of AI, is a fundamental way to make the computer intelligent, and is applied to various fields of AI. ML and DL generally include technologies such as an artificial neural network, a belief network, reinforcement learning, transfer learning, inductive learning, and learning from demonstrations.

An image gaze correction method and a method for training a gaze correction model provided by the embodiments of the disclosure relate to technologies such as machine learning of artificial intelligence and computer vision, which will be introduced and described below.

FIG. 1 is a schematic diagram of a solution implementation environment according to an embodiment of the disclosure. The solution implementation environment may be a video conference system. The solution implementation environment is used for implementing a gaze correction system 100, which may include a server 10 and a plurality of terminals 20.

The terminal 20 may be an electronic device such as a mobile phone, a tablet computer, a Personal Computer (PC), a smart TV, and a multimedia playback device. A client running a video conference application program may be installed in the terminal 20, so as to provide a user with a video conference function.

The server 10 may be one server, a server cluster including a plurality of servers, a cloud computing service center, or another electronic device. The server 10 may be a backend server of the video conference application program, and is configured to provide a backend server for the client of the video conference application program.

The terminal 20 may communicate with the server 10 through a network 30. In addition, the gaze correction system 100 further includes a database 40 configured to provide data support to the server 20, for example, provide a training sample to the server 20 during model training.

The terminal 20 is configured to transmit an image to-be-corrected to the server 10 through the network 30 during the video conference, receive, through the network 30, a gaze corrected image transmitted by the server 10, and present the gaze corrected image.

The server 10 is configured to receive, through the network 30, the image to-be-corrected transmitted by the terminal 20, and acquire an eye image to-be-corrected from the image to-be-corrected; perform feature extraction processing on the eye image to-be-corrected to obtain feature information of the eye image to-be-corrected; perform, based on the feature information and a target gaze direction, gaze correction processing on the eye image to-be-corrected to obtain an initially corrected eye image and an eye contour mask, the target gaze direction referring to a gaze direction to which an eye gaze in the eye image to-be-corrected is to be corrected, and the eye contour mask being used for indicating a probability that a pixel position in the eye image to-be-corrected belongs to an eye region; perform, by using the eye contour mask, adjustment processing on the initially corrected eye image to obtain a corrected eye image; and generate a gaze corrected image based on the corrected eye image. The server is further configured to transmit the gaze corrected image to the terminal 20 through the network 30.

Figure 2:
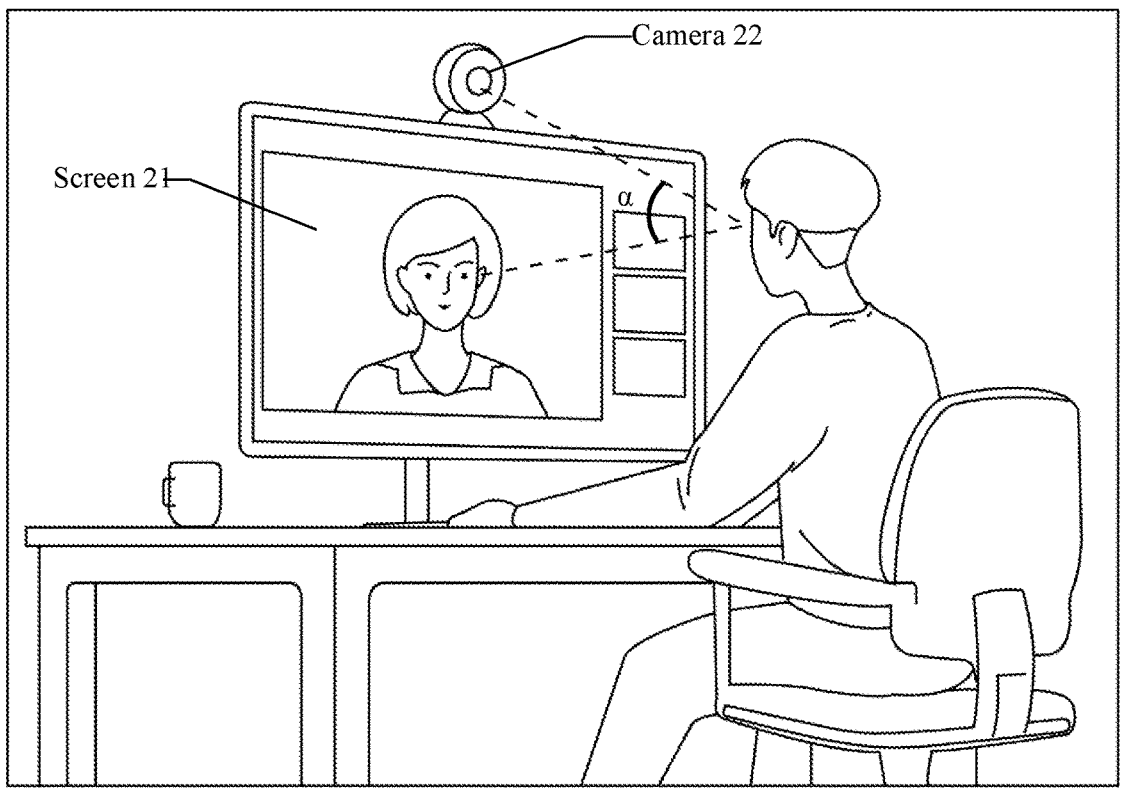
FIG. 2 is a schematic diagram of an included angle formed by a camera, human eyes, and an arrival position of a gaze of the human eyes in a video conference scenario.

FIG. 2 is a schematic diagram of an included angle formed by a camera, human eyes, and an arrival position of a gaze of the human eyes in a video conference scenario. As shown in FIG. 2, in a video conference scenario, the gaze of a user is generally looking at the other party in a screen 21, while a camera 22 is not in the screen 21 but in another position (above the screen 21 as shown in FIG. 2), and therefore, there is often an included angle (an included angle α shown by dotted lines in FIG. 2) between the camera 22, the human eyes, and the position at which the gaze of the human eyes is looking. From the perspective of the other party user, the gaze of the user is not looking at the other party user, but is downward, which affects the communication experience of the users. Moreover, in addition to the video conference scenario, a similar problem exists in a scenario such as a video call and a live video streaming. Therefore, gaze correction needs to be performed to solve the problem of poor image presentation effect, and to improve the presentation effect of the image and the efficiency of gaze correction.

Based on this, the embodiments of the disclosure provide an image gaze correction method and a method for training a gaze correction model, which may obtain a real and accurate gaze correction result even for an image with a large eyeball offset.

In addition, the image gaze correction method according to the embodiments of the disclosure may also be applied to a scenario such as a video conference, a video call, a live video streaming, and image processing. The image processing scenario, such as a sharing scenario of social software, provides an editing function of changing the gaze, and supports correction of the gaze of an object in an image and a video of a user. For example, the object in the image originally looking at a is corrected to look at b, so that the image and the video convey information different from that in the original image and video.

Figure 3:
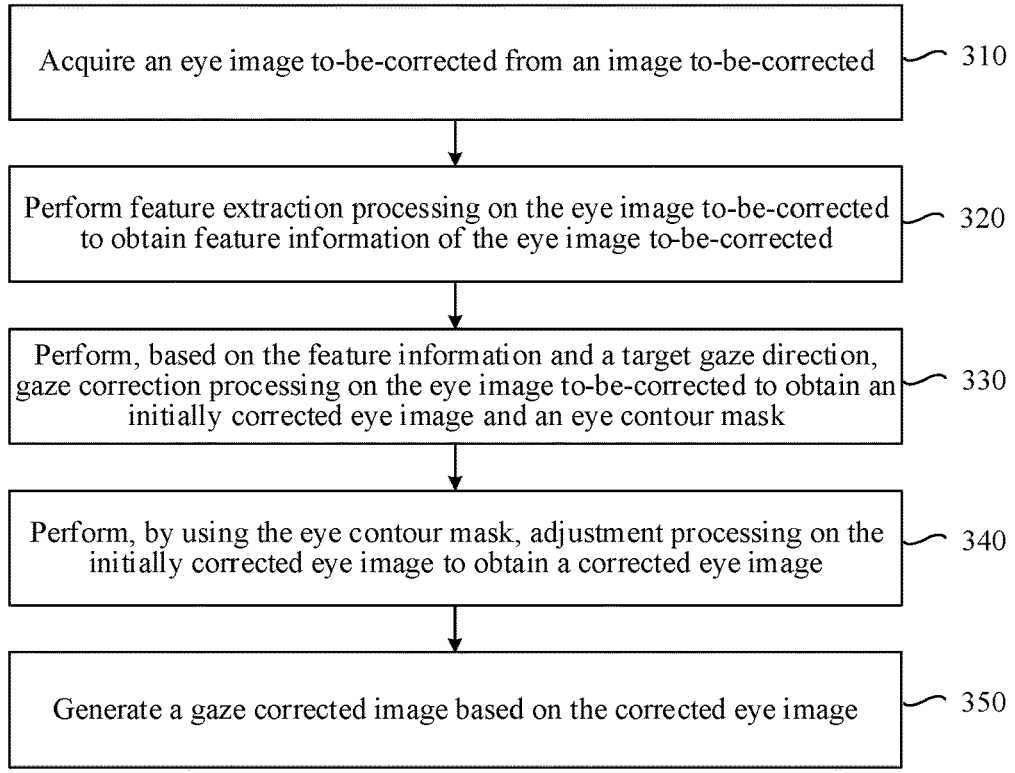
FIG. 3 is a first flowchart of an image gaze correction method according to an embodiment of the disclosure.

FIG. 3 is a flowchart of an image gaze correction method according to an embodiment of the disclosure. An execution body (referred to as the electronic device provided by example embodiments of the disclosure) of the image gaze correction method may be a terminal device such as a mobile phone, a tablet computer, and a PC, or a server. The image gaze correction method may include steps 310 to 350.

Step 310: Acquire an eye image to-be-corrected from an image to-be-corrected.

In the embodiments of the disclosure, the image to-be-corrected refers to an image including a face, for example, an image including a human face. The image to-be-corrected may be a photo or a picture, or may be a video frame image in a video, which is not limited in the embodiments of the disclosure. The eye image to-be-corrected is captured from the image to-be-corrected, and includes an image of an eye region that requires gaze correction.

It should be noted that when the image to-be-corrected includes two eyes, for example, a human face image includes left and right human eyes, two eye images to-be-corrected may be obtained from one image to-be-corrected, one eye image to-be-corrected corresponds to the eye image to-be-corrected for the left eye, and the other eye image to-be-corrected corresponds to the eye image to-be-corrected for the right eye.

In the embodiments of the disclosure, an electronic device performs face detection on the image to-be-corrected. Here, the image to-be-corrected being a human face image and the face detection being human face detection are illustrated as an example to determine whether the human face image contains a human face, and to determine a position of a human face if the human face image contains the human face. In other words, in a case that the human face image contains a human face, human face key point detection is performed. The embodiments of the disclosure are used for gaze correction and focus the eye region, and therefore, when performing the human face key point detection, the electronic device may only detect key points of eyes, and detection of key points of other parts such as the mouth and nose is not required.

In the embodiments of the disclosure, the electronic device determines a minimum circumscribed rectangle of the eye based on contour key points of the eye; specifies a multiple for extension of the minimum circumscribed rectangle to obtain an image capture frame of the eye; and captures, based on the image capture frame of the eye, the eye image to-be-corrected of the eye from the image to-be-corrected.

It should be noted that the minimum circumscribed rectangle of an eye refers to a minimum circumscribed rectangular frame containing the eye. For example, the minimum circumscribed rectangle of the left eye refers to a minimum circumscribed rectangular frame containing the left eye. The above specified multiple may be a preset value, such as 1.5 times, 2 times, or 3 times, which is not limited in the embodiments of the disclosure. In the process of obtaining an image capture frame by performing enlarging processing on the minimum circumscribed rectangle of the eye, the electronic device takes a center point of the minimum circumscribed rectangle as the center, and performs proportional enlarging processing on the minimum circumscribed rectangle to obtain an image capture frame. A center point of the image capture frame is the same as the center point of the minimum circumscribed rectangle above. Finally, an image capture technology is used for capturing an image content in the image capture frame of the eye from the image to-be-corrected, so as to obtain an eye image to-be-corrected of the eye.

By acquiring the eye image to-be-corrected from the image to-be-corrected and performing the gaze correction processing on the eye image to-be-corrected, the amount of calculation in subsequent gaze correction steps may be reduced and the efficiency of the gaze correction may be improved.

Step 320: Perform feature extraction processing on the eye image to-be-corrected to obtain feature information of the eye image to-be-corrected.

In the embodiments of the disclosure, the electronic device performs feature extraction processing on the eye image to-be-corrected to obtain an eye expression feature, an eye texture feature, and an environmental feature (or an environment-related feature); and determines the specific eye expression feature, the eye texture feature, and the environment-related feature as the feature information. In addition, as for the feature extraction processing, the feature extraction processing may further be performed on the eye image to-be-corrected through a neural network model to obtain the feature information of the eye image to-be-corrected. The feature information is used for reflecting an image feature of the eye image to-be-corrected.

It should be noted that the feature information includes the eye expression feature, an eye expression irrelevant feature, and the environmental feature. The eye expression feature refers to feature information related to an eye gaze. The eye expression irrelevant feature refers to feature information irrelevant to the eye gaze, for example, information such as the eye texture feature. The environmental feature refers to information that may reflect features such as illumination, brightness, and saturation related to an environment of the image.

In the embodiments of the disclosure, the gaze correction is performed in combination with various types of feature information, which helps improve the robustness of gaze correction in different environments, and may achieve a better gaze correction effect in various different environments.

Step 330: Perform, based on the feature information and a target gaze direction, gaze correction processing on the eye image to-be-corrected to obtain an initially corrected eye image and an eye contour mask.

It should be noted that the target gaze direction refers to a gaze direction to which the eye gaze in the eye image to-be-corrected is to be corrected. In the embodiments of the disclosure, the target gaze direction refers to a direction toward a camera, e.g., a direction right facing the camera, so that the eye gaze in the eye image to-be-corrected may be corrected to the direction toward the camera. In the embodiments of the disclosure, the target gaze direction includes a Pitch angle and a Yaw angle. For example, in a case of right facing the camera, it is defined that the pitch angle equals to 0° and the yaw angle also equals to 0°.

In the embodiments of the disclosure, the eye contour mask is used for indicating a probability that a pixel position in the eye image to-be-corrected belongs to an eye region. For example, the eye contour mask may be represented as a one-dimensional image, and the size (including a height and a width) of the one-dimensional image is the same as the size of the eye image to-be-corrected. A pixel value of a certain pixel in the eye contour mask may be a probability value, indicating a probability that a pixel in the eye image to-be-corrected in the same position belongs to the eye region. For example, a pixel value of a position with coordinates (i, j) in the eye contour mask may be a probability value belonging to a value range of [0, 1], indicating a probability that a pixel of a position with coordinates (i, j) in the eye image to-be-corrected belongs to the eye region.

In the embodiments of the disclosure, the above steps 320 and 330 may be implemented by a gaze correction model. The gaze correction model may be a neural network model, and may include an encoding network and a decoding network. The encoding network is configured to perform feature extraction processing on input data (that is, the eye image to-be-corrected) to obtain feature information of the eye image to-be-corrected. The decoding network is configured to perform, based on the above feature information and the target gaze direction, gaze correction processing on the eye image to-be-corrected to obtain an initially corrected eye image and an eye contour mask.

Step 340: Perform, by using the eye contour mask, adjustment processing on the initially corrected eye image to obtain a corrected eye image.

It should be noted that the adjustment processing is processing for restoring a region outside the eye region in the initially corrected eye image. In the embodiments of the disclosure, step 340 includes the following steps.

Step 3401: Fuse (for example, multiply) pixel values of corresponding positions in the eye contour mask and the initially corrected eye image to obtain a first intermediate image.

Step 3402: Fuse (for example, multiply) pixel values of corresponding positions in a mapped image corresponding to the eye contour mask and the eye image to-be-corrected to obtain a second intermediate image.

Step 3403: Integrate (for example, add) pixel values of corresponding positions in the first intermediate image and the second intermediate image to obtain the corrected eye image.

In the embodiments of the disclosure, a pixel value of each position in the eye contour mask is a probability value belonging to a value range of [0, 1], and a pixel value of any position in the mapped image corresponding to the eye contour mask is a value obtained by subtracting the pixel value (that is, the probability value) at the same position in the eye contour mask from 1. For example, a pixel value (that is, a probability value) at a position with coordinates (i, j) in the eye contour mask is 0.2, and therefore, a pixel value at a position with coordinates (i, j) in the mapped image corresponding to the eye contour mask is 1−0.2=0.8.

In the embodiments of the disclosure, the corrected eye image generated by the electronic device may be represented by the following expression: Corrected eye image=eye contour mask×initially corrected eye image+(1−eye contour mask)×eye image to-be-corrected.

Step 350: Generate a gaze corrected image based on the corrected eye image.

In the embodiments of the disclosure, the electronic device integrates the corrected eye image into the original image to-be-corrected, and uses the corrected eye image (or integrated eye image) to cover or replace the eye image to-be-corrected in the image to-be-corrected to obtain the gaze corrected image.

In the embodiments of the disclosure, the electronic device integrates the corrected eye image into the eye image to-be-corrected at an image capture frame position of the image to-be-corrected to obtain an integrated image; and performs image harmonization processing at the image capture frame position in the integrated image to obtain the gaze corrected image. The image harmonization processing is used for eliminating boundary traces at the image capture frame position.

In the embodiments of the disclosure, the method used by the electronic device for performing the image harmonization processing is not limited. For example, Gaussian blurring, erosion and dilation, an image harmonization method based on deep learning, or the like may be used.

In the embodiments of the disclosure, the electronic device adopts the following steps to perform the image harmonization processing at the image capture frame position in the integrated image to obtain the gaze corrected human face image.

First, the electronic device generates an initialized mask image of the same size as the image to-be-corrected. A pixel value of the initialized mask image at the image capture frame position is 1, and pixel values of other positions is 0. For example, it is assumed that the size of the original image to-be-corrected is C×H×W; where C is the number of channels (for example, including three channels of Red (R), Green (G), and Blue (B)), H is the height (for example, the number of pixels contained in the height direction), and W is the width (for example, the number of pixels contained in the width direction). The image capture frame is a rectangular frame of a size h×w at a target position in the image to-be-corrected, where h is the height (for example, the number of pixels contained in the height direction), and w is the width (for example, the number of pixels contained in the width direction). The size of the eye image to-be-corrected and the size of the corrected eye image are both c×h×w, where c is the number of channels (for example, including three channels of R, G, and B).

It should be noted that the electronic device generates the initialized mask image of the size C×H×W. For each single-channel image H×W in the C channels, a pixel value in the h×w image capture frame at the above target position is set to 1, and pixel values of other regions except the image capture frame are set to 0, for serving as the initialized mask image.

Next, the electronic device performs noise processing (for example, erosion processing and Gaussian blurring) on the initialized mask image to obtain a processed mask image.

It should be noted that the erosion processing is used for eliminating boundary points between objects. For example, an ellipse template may be used to perform the erosion processing on the initialized mask image to obtain a mask image after erosion. The Gaussian blurring, also referred to as Gaussian smoothing, is used for reducing image noise and level of details. After obtaining the above mask image after erosion, the electronic device may perform Gaussian blurring on the mask image after erosion to obtain the processed mask image. The processed mask image is still an image of the size C×H×W, a value of each pixel is in a range of [0, 1], and for a pixel originally located at a boundary position between 0 and 1, a value thereof will be between 0 and 1 after the above erosion operation and Gaussian blurring, thereby achieving a smooth transition.

Further, the electronic device fuses (for example, multiplies) pixel values of corresponding positions in the processed mask image and the integrated image to obtain a first generated image.

Then, the electronic device fuses (for example, multiplies) pixel values of corresponding positions in a mapped image corresponding to the processed mask image and the human face image to obtain a second generated image.

Finally, the electronic device integrates (for example, adds) pixel values of corresponding positions in the first generated image and the second generated image to obtain the gaze corrected image.

It should be noted that the pixel value of each position in the processed mask image is a value belonging to the value range of [0, 1]. The pixel value of any position in the mapped image corresponding to the processed mask image is a value obtained by subtracting the pixel value in the same position in the processed mask image from 1. For example, a pixel value at a position with coordinates (i, j) in the processed mask image is 0.3, and therefore, a pixel value at a position with coordinates (i, j) in the mapped image corresponding to the processed mask image is 1-0.3=0.7.

In the embodiments of the disclosure, the gaze corrected image generated by the electronic device may be represented by the following expression: Gaze corrected human face image=processed mask image×integrated image+(1−processed mask image)×image to-be-corrected.

Through the image harmonization processing, the boundary traces located at the image capture frame position in the integrated image may be eliminated, so that the finally obtained gaze corrected image has no obvious splicing traces. Accordingly, the gaze correction effect may be enhanced.

Figure 4:
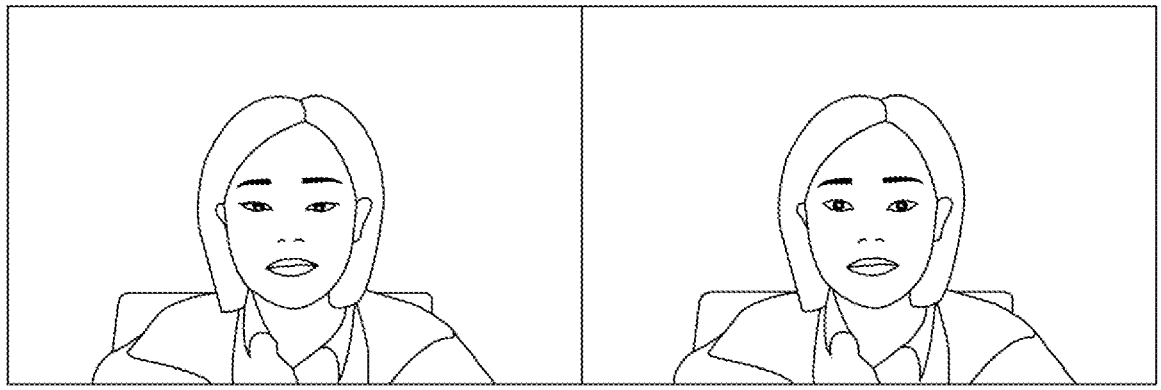
FIG. 4 is a first contrast diagram before and after gaze correction according to an embodiment of the disclosure.

FIG. 4 is a contrast diagram before and after gaze correction by using a gaze correction method according to an embodiment of the disclosure. As shown in FIG. 4, an image 41 is an image to-be-corrected without gaze correction, and the gaze of a human eye is offset. An image 42 is a gaze corrected image, and the gaze of the eye is focused straight ahead.

It should be noted that in order to achieve gaze correction, an eye motion flow field may also be generated through the eye image to-be-corrected, and then displacement processing is performed, based on the eye motion flow field, on a pixel in the above eye image to-be-corrected, so as to generate a corrected eye image. However, in the above process of realizing gaze correction, gaze correction is realized by learning the movement of the pixel position. In this way, all generated pixels are from inputted pixels, and therefore, the flexibility is poor, and it is easy to bring about distortion. For example, when the offset of the eyeball is large, distortion will occur.

Figure 5:
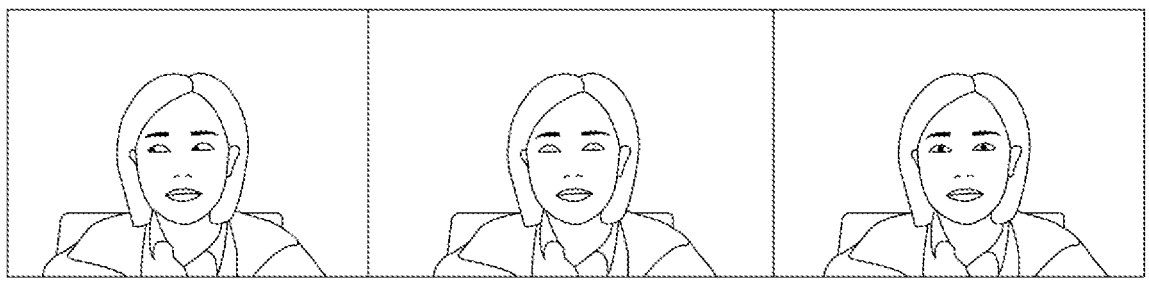
FIG. 5 is a second contrast diagram before and after gaze correction according to an embodiment of the disclosure.

FIG. 5 is a second contrast diagram before and after gaze correction according to an embodiment of the disclosure. As shown in FIG. 5, an image 51 is an image to-be-corrected without gaze correction, and the offset of the eyeball is relatively large. An image 52 is a gaze corrected image generated by a gaze correction solution based on a flow model (or an eye motion flow field), and it may be clearly seen from FIG. 5 that the eyeball position is distorted in the image 52. An image 53 is a gaze corrected image after the image gaze correction method according to the embodiments of the disclosure is used. The gaze of the human eye is focused directly ahead, and the position of the eyeball is not distorted.

The image gaze correction method according to the embodiments of the disclosure obtains a corrected eye image by performing gaze correction processing on the eye image to-be-corrected based on the feature information of the eye image to-be-corrected and the target gaze direction, and may achieve a real and accurate gaze correction effect even for an image with a large eyeball offset.

In addition, the embodiments of the disclosure combine the eye contour mask in the process of gaze correction, and use the attention mechanism to fuse the eye image to-be-corrected and the initially corrected eye image, which not only improves the stability of the generated image but also ensures that only the image content inside the eye contour is subject to gaze correction, while the image content outside the eye contour does not require gaze correction, thereby improving the gaze correction effect of the finally obtained corrected eye image.

Figure 6:
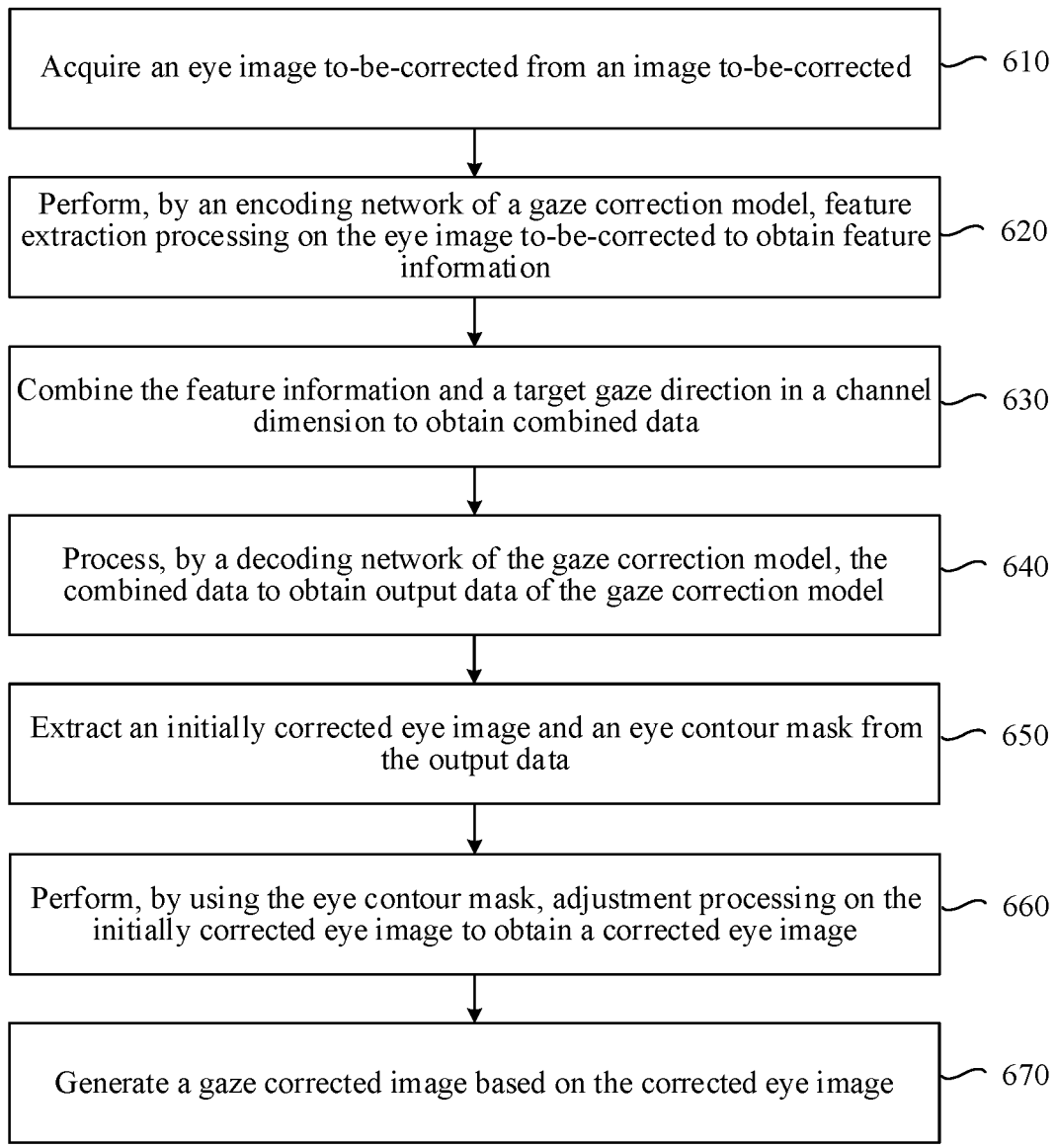
FIG. 6 is a second flowchart of an image gaze correction method according to an embodiment of the disclosure.

FIG. 6 is a flowchart of an image gaze correction method according to an embodiment of the disclosure. An execution body of the image gaze correction method may be a terminal device such as a mobile phone, a tablet computer, and a PC, or an electronic device such as a server. The image gaze correction method may include steps 610 to 670.

Step 610: Acquire an eye image to-be-corrected from an image to-be-corrected.

It should be noted that step 610 is the same as or similar to step 310.

Step 620: Perform, by an encoding network of a gaze correction model, feature extraction processing on the eye image to-be-corrected to obtain feature information.

The feature information includes an eye expression feature, an eye texture feature, and an environmental feature.

Step 630: Combine the feature information and a target gaze direction in a channel dimension to obtain combined data.

In the embodiments of the disclosure, after obtaining the feature information, the electronic device combines the feature information and the target gaze direction in the channel dimension to obtain the combined data. For example, the height of the eye image to-be-corrected is H, and the width is W. H and W may represent the number of pixels in a height direction and the number of pixels in a width direction, respectively. Then, the eye image to-be-corrected is a three-channel image of H×W×3, the eye image to-be-corrected is inputted to the encoding network of the gaze correction model, and the feature information is outputted. After that, the feature information and the target gaze direction are combined in the channel dimension to obtain the combined data. The target gaze direction includes a pitch angle and a yaw angle. For example, in a case of right facing a camera, it is defined that the pitch angle equals to 0° and the yaw angle also equals to 0°, for correcting the eye gaze of the eye image to-be-corrected to the direction of right facing the camera.

Step 640: Process, by a decoding network of the gaze correction model, the combined data to obtain output data of the gaze correction model.

Step 650: Extract an initially corrected eye image and an eye contour mask from the output data.

It should be noted that the decoding network is configured to perform gaze correction processing on the eye image to-be-corrected based on the combined data of the above feature information and target gaze direction, and obtain the initially corrected eye image and the eye contour mask. For example, the output data of the gaze correction model may include a four-channel image of H×W×4, from which data H×W×3 of 3 channels is extracted as the initially corrected eye image, and the data H×W×1 of the remaining one channel is used as the eye contour mask.

Step 660: Perform, by using the eye contour mask, adjustment processing on the initially corrected eye image to obtain a corrected eye image.

It should be noted that step 660 is the same as or similar to step 340.

Step 670: Generate a gaze corrected image based on the corrected eye image.

It should be noted that step 670 is the same as or similar to step 350.

Figure 7:
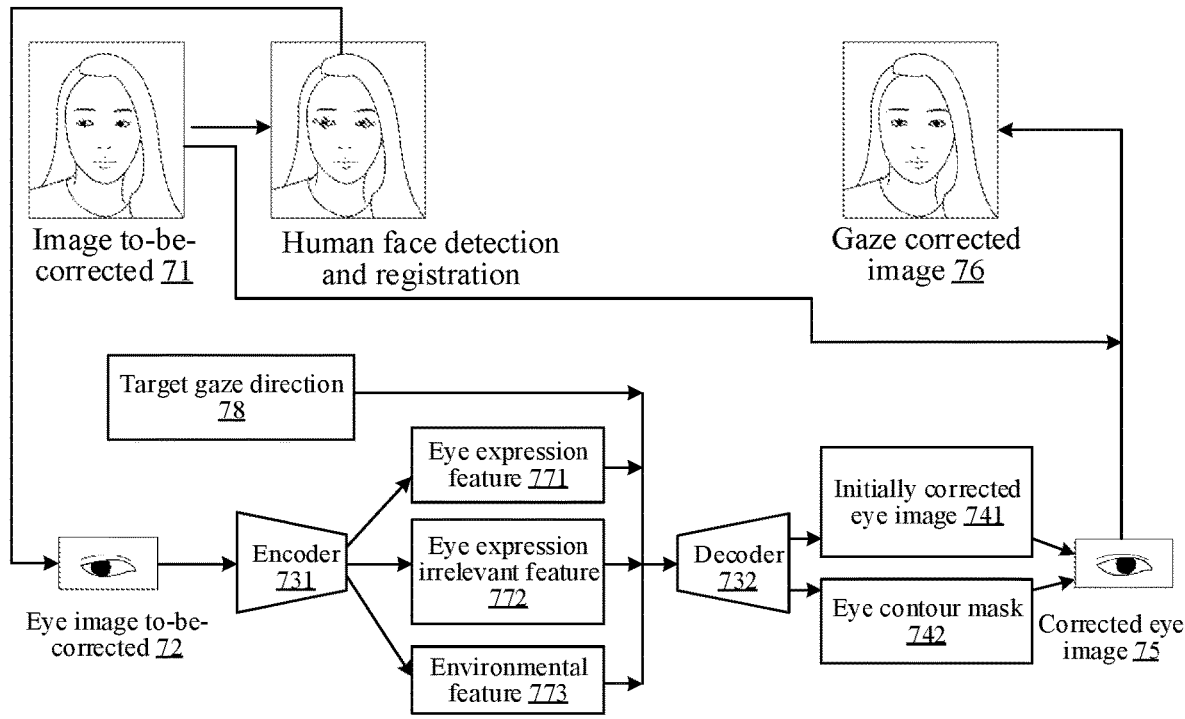
FIG. 7 is a schematic flowchart of using a gaze correction model according to an embodiment of the disclosure.

FIG. 7 is a schematic flowchart of using a gaze correction model according to an embodiment of the disclosure. Referring to FIG. 7, human face detection and registration is performed on an inputted image to-be-corrected 71, so as to capture an eye image to-be-corrected 72 from the inputted image to-be-corrected 71, and the eye image to-be-corrected 72 is inputted into an encoding network (that is, an encoder 731 shown in FIG. 7) of a gaze correction model to obtain feature information such as an eye expression feature 771, an eye expression irrelevant feature 772, and an environmental feature 773. The feature information is fused with a target gaze direction 78, and a fusion result is inputted to a decoding network (that is, a decoder 732 shown in FIG. 7) of the gaze correction model. The decoding network outputs an initially corrected eye image 741 and an eye contour mask 742. The eye contour mask 742 is used to perform adjustment processing on the initially corrected eye image 741 to generate a corrected eye image 75. Finally, the corrected eye image 75 is integrated with the image to-be-corrected 71 to obtain a gaze corrected image 76.

The image gaze correction method according to the embodiments of the disclosure, through feature extraction and generation of the initially corrected eye image and the eye contour mask, has a simple and efficient process, so that the gaze correction function truly achieves a practically available standard, and is suitable for a scenario such as a video conference, a video call, and a live video streaming.

A process of training the gaze correction model is introduced and explained below, and the content involved during the use of the gaze correction model is similar to the content involved in the training process.

Figure 8:
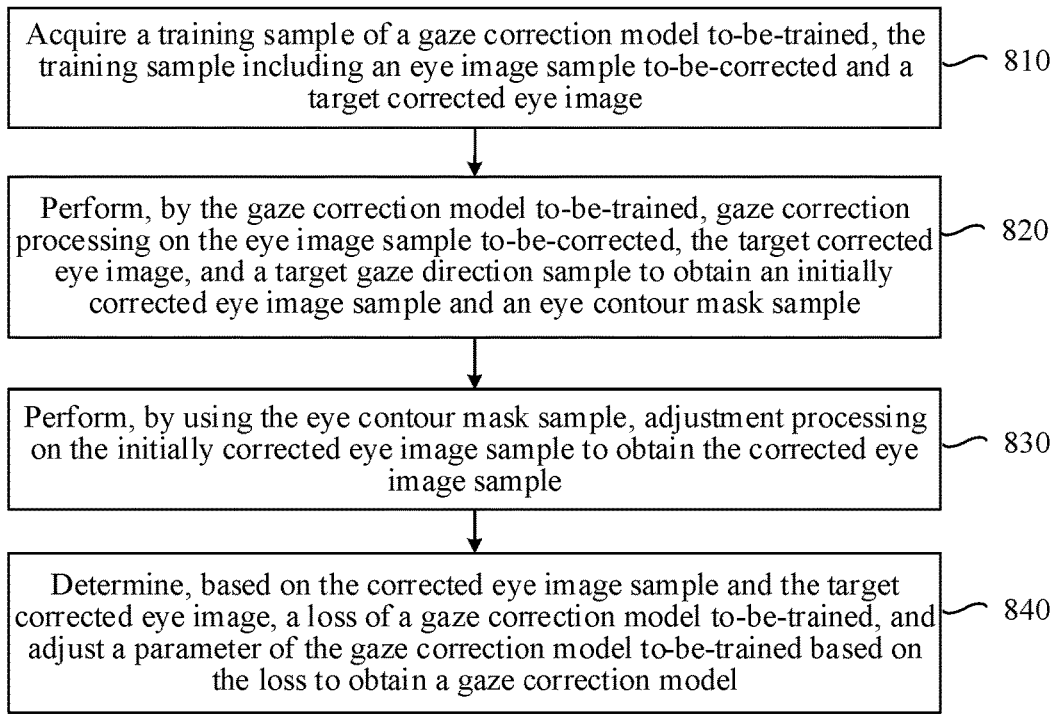
FIG. 8 is a flowchart of a method for training a gaze correction model according to an embodiment of the disclosure.

FIG. 8 is a flowchart of a method for training a gaze correction model according to an embodiment of the disclosure. An execution body of the method for training a gaze correction model may be an electronic device such as a computer and a server. The method for training a gaze correction model may include steps 810-840.

Step 810: Acquire a training sample of a gaze correction model to-be-trained, the training sample including an eye image sample to-be-corrected and a target corrected eye image.

It should be noted that the correction model to-be-trained may be a neural network model, which is a model to-be-trained for gaze correction, and may be an original model or a pre-trained model, which is not limited in the embodiments of the disclosure.

In the embodiments of the disclosure, input data of the gaze correction model to-be-trained includes the eye image sample to-be-corrected, and output data includes an initially corrected eye image and an eye contour mask.

It should be noted that each training sample includes two images, which are two images of the same object (for example, a person) with different gazes captured at the same head pose angle. One image may be an image in any gaze direction (for example, the gaze is facing a screen region), and the image is used as the eye image sample to-be-corrected. The other image is an image with the gaze right facing the camera, and the image is used as the target corrected eye image. The gaze correction model to-be-trained is trained by using such training samples, and an end-to-end gaze correction model may be obtained by the training. The gaze correction model outputs a corrected eye image with an emmetropic effect (for example, the gaze is facing the camera) based on the inputted eye image to-be-corrected.

It should be further noted that different training samples may be obtained based on different objects (for example, different characters), or may be obtained based on different head pose angles, which is not limited in the embodiments of the disclosure. In other words, a training sample set of the gaze correction model to-be-trained may include a plurality of training samples, and the plurality of training samples may include training samples with different objects and include training samples with different head pose angles, so that the gaze correction model obtained by training may adapt to different objects and different head pose angles, thereby improving the robustness of the gaze correction model.

Step 820: Perform, by the gaze correction model to-be-trained, gaze correction processing on the eye image sample to-be-corrected, the target corrected eye image, and a target gaze direction sample to obtain an initially corrected eye image sample and an eye contour mask sample.

In the embodiments of the disclosure, the target gaze direction sample refers to a gaze direction to which the eye gaze in the eye image sample to-be-corrected needs to be corrected. It should be noted that during the training, the target gaze direction sample may be a direction (0°, 0°) right facing the camera, or any other direction, so that the gaze correction model obtained by training may correct the gaze to have the target gaze direction sample.

In the embodiments of the disclosure, the eye contour mask is used for indicating a probability that a pixel position in the eye image sample to-be-corrected belongs to an eye region.

Figure 9:
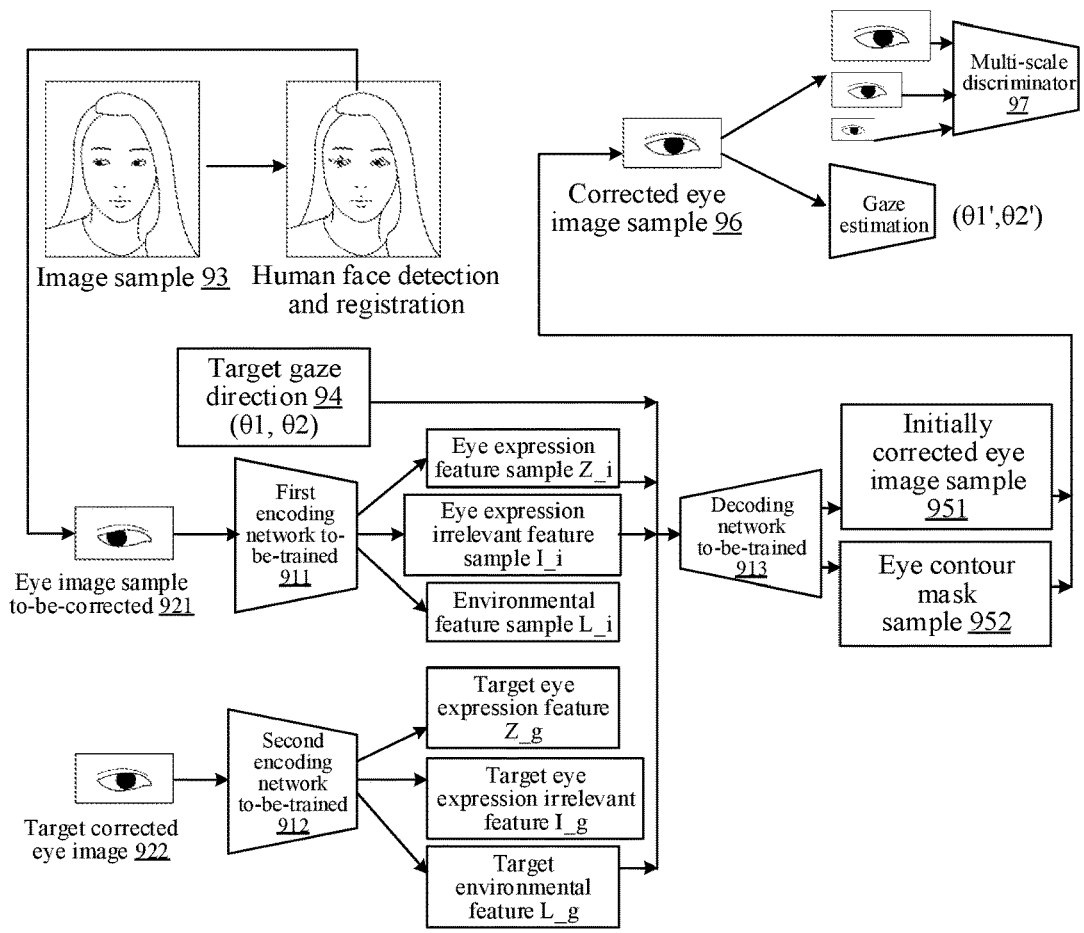
FIG. 9 is a schematic flowchart of training a gaze correction model according to an embodiment of the disclosure.

FIG. 9 is a schematic flowchart of training a gaze correction model according to an embodiment of the disclosure. In the embodiments of the disclosure, as shown in FIG. 9, the gaze correction model to-be-trained includes a first encoding network to-be-trained 911, a second encoding network to-be-trained 912, and a decoding network to-be-trained 913.

Feature extraction processing is performed, by the first encoding network to-be-trained 911, on an eye image sample to-be-corrected 921 to obtain a feature information sample corresponding to the eye image sample to-be-corrected, including an eye expression feature sample $Z\_i$, an eye expression irrelevant feature sample $I\_i$, and an environmental feature sample $L\_i$. The eye image sample to-be-corrected 921 is obtained by performing human face detection and registration on an image sample 93.

Feature extraction processing is performed, by the second encoding network to-be-trained 912, on a target corrected eye image 922 to obtain target feature information corresponding to the target corrected eye image, including a target eye expression feature $Z\_g$, a target eye expression irrelevant feature $I\_g$, and a target environmental feature $L\_g$.

Gaze correction processing is performed, by the decoding network to-be-trained 913, on the eye expression feature sample $Z\_i$ and the eye expression irrelevant feature sample $I\_i$ corresponding to the eye image sample to-be-corrected, the target environmental feature $L\_g$ corresponding to the target corrected eye image, and a target gaze direction 94 ($01$, $02$) to obtain an initially corrected eye image sample 951 and an eye contour mask sample 952. Here, adjustment processing is performed, by using the eye contour mask sample 952, on the initially corrected eye image sample 951 to obtain a corrected eye image sample 96.

During the training, the two images, that is, the eye image sample to-be-corrected and the target corrected eye image, contained in each training sample have a difference in ambient noise such as light. The electronic device, during learning of the encoder (that is, the first encoding network to-be-trained), decouples the feature information into the eye expression feature sample and the eye expression irrelevant feature sample, and inputs the target environmental feature corresponding to the target corrected eye image to the decoding network to-be-trained, which may reduce the interference caused by the ambient noise, and improve the accuracy of the gaze correction.

Step 830: Perform, by using the eye contour mask sample, adjustment processing on the initially corrected eye image sample to obtain the corrected eye image sample.

In the embodiments of the disclosure, the electronic device multiplies pixel values of corresponding positions in the eye contour mask sample and the initially corrected eye image sample to obtain a third intermediate image; multiplies pixel values of corresponding positions in a mapped image corresponding to the eye contour mask sample and the eye image sample to-be-corrected to obtain a fourth intermediate image; and adds pixel values of corresponding positions in the third intermediate image and the fourth intermediate image to obtain the corrected eye image sample. The process of acquiring the corrected eye image sample is similar to step 340.

Step 840: Determine, based on the corrected eye image sample and the target corrected eye image, a loss of a gaze correction model to-be-trained, and adjust a parameter of the gaze correction model to-be-trained based on the loss to obtain a gaze correction model.

It should be noted that the loss of the gaze correction model to-be-trained is used for measuring the performance of the gaze correction model to-be-trained.

In the embodiments of the disclosure, the electronic device adopts a gradient descent algorithm to adjust the parameter of the gaze correction model to-be-trained based on the loss of the gaze correction model to-be-trained, so as to optimize the model parameter. When the training is completed, the gaze correction model is obtained.

In the embodiments of the disclosure, the loss of the gaze correction model to-be-trained may include the following aspects.

First, the electronic device determines a reconstruction loss based on a pixel difference between the corrected eye image sample and the target corrected eye image.

It should be noted that the reconstruction loss is used for measuring a pixel difference between two images, and the reconstruction loss may be calculated by formula (1), and formula (1) is shown below.

$$\text{Reconstruction\_loss} = |\text{fake\_img} - gt\_\text{img}| \qquad (1);$$

where Reconstruction_loss represents the reconstruction loss, fake_img represents the corrected eye image sample, and gt_img represents the target corrected eye image. The reconstruction loss may be an L1 loss, an L2 loss, or a loss obtained by using some other distance algorithms, which is not limited in the embodiments of the disclosure.

Next, the electronic device determines a feature loss based on an image feature difference between the corrected eye image sample and the target corrected eye image.

It should be noted that the feature loss is used for measuring an image feature difference between two images.

In the embodiments of the disclosure, the feature loss includes a Learned Perceptual Image Patch Similarity (LPIPS) loss, and a visual perception difference between the two images may be accurately acquired through the LPIPS loss.

It should be noted that the LPIPS loss may generate a loss calculation model by pre-training in advance. Here, the electronic device inputs the corrected eye image sample and the target corrected eye image into a feature loss calculation model. The LPIPS loss between the corrected eye image sample and the target corrected eye image is outputted by the feature loss calculation model. The loss calculation model may be a pre-trained convolutional neural network model, such as a Visual Geometry Group (VGG) model.

For example, an image feature extracted from the corrected eye image sample fake_img by the VGG model is recorded as vgg_feature(fake_img), and an image feature extracted from the target corrected eye image gt_img by the VGG model is recorded as vgg_feature(gt_img). When features of different network layers corresponding to vgg_feature(fake_img) include fake_img_fea1, fake_img_fea2, fake_img_fea3, and fake_img_fea4, and features of different network layers corresponding to vgg_feature (gt_img) include gt_img_fea1, gt_img_fea2, gt_img_fea3, and gt_img_fea4, the LPIPS loss LPIPS loss is as that shown in formula (2).

$$\begin{aligned}\text{LPIPS\_loss} = &|\text{fake\_img\_fea1} - gt\_\text{img\_fea1}| + |\text{fake\_img\_fea2} - gt\_\text{img\_fea2}| + |\text{fake\_img\_fea3} - \\>\_\text{img\_fea3}| + |\text{fake\_img\_fea4} - gt\_\text{img\_fea4}|\end{aligned} \qquad (2).$$

In the embodiments of the disclosure, the electronic device may generate a plurality of simulated image pairs by using a software simulation technology, and each simulated image pair includes a set of corresponding non-emmetropic eye simulated image and emmetropic eye simulated image. Here, the electronic device uses the plurality of simulated image pairs above for training to obtain the loss calculation model.

It should be noted that although the appearance and texture information of the simulated image is different from that of a real eye, a relationship between a gaze direction and an eyeball position of the simulated image is no different from a relationship between a gaze direction and an eyeball position of the real object, and the gaze direction of the simulated image has been determined when the data is generated. In this way, a lot of annotation costs may be reduced and the standard efficiency may be improved.

The loss calculation model pre-trained by the simulated images in the embodiments of the disclosure may be directly used for the calculation of the LPIPS loss in the model training corresponding to real eye data. The visual perception information represented by the LPIPS loss obtained by the loss calculation model is the gaze direction, and therefore, the training effect and efficiency of the model may be improved.

Next, the electronic device determines a generative adversarial loss between the corrected eye image sample and the target corrected eye image.

It should be noted that a Generative Adversarial Network (GAN) is a method of unsupervised learning, which uses two neural networks to learn against each other. It consists of a generative network and a discriminant network. The generative network randomly samples from a Latent Space as an input, and an output result of the generative network needs to imitate real samples in a training set as much as possible. An input of the discriminant network is a real sample or the output result of the generative network, and the discriminant network is used for distinguishing the output result of the generative network from the real sample as much as possible. The generative network, on the other hand, tries to fool the discriminant network as much as possible. The two networks fight against each other, constantly adjust parameters, and finally generate a fake image taken as a real one.

In the embodiments of the disclosure, the above gaze correction model including the first encoding network to-be-trained, the second encoding network to-be-trained, and the decoding network to-be-trained is the generative network. The discriminant network, such as a multi-scale discriminator 97 shown in FIG. 9, is used for discriminating whether an image transmitted to the discriminator D is an image generated by the generative network (that is, the corrected eye image sample) or a real image (that is, the target corrected eye image).

In the embodiments of the disclosure, the discriminator D may be a multi-scale discriminator. For example, an input of the multi-scale discriminator may be an image in different scales such as an original image, ½ of the size of the original image, and ¼ of the size of the original image. The generative adversarial loss includes a generative network loss and a discriminant network loss, the generative network loss is a loss of the generative network, and the discriminant network loss is a loss of the discriminant network. The discriminant network loss is used for measuring a discrimination accuracy of the discriminant network, and the generative network loss is used for measuring a proximity between the generated corrected eye image sample and the target corrected eye image.

For example, the discriminant network loss D_loss may be expressed by formula (3), and the generative network loss G_loss may be expressed by formula (4); Formula (3) and formula (4) are shown below.

$$D\_loss=⅓*(-\log D(gt\_img)-\log(1-D(fake\_img))-\log D(gt\_img\_½)-\log(1-D(fake\_img\_½))-\log D(gt\_img\_¼)-\log(1-D(fake\_img\_¼))) \quad (3);$$

$$G\_loss=\log(1-D(fake\_img)) \quad (4);$$

where D(X) represents a discrimination result of the discriminant network for an input image X; gt_img_½ is ½ of the target corrected eye image, gt_img_¼ is ¼ of the target corrected eye image; fake_img_½ is ½ of the corrected eye image sample, and fake_img_¼ is ¼ of the corrected eye image sample.

Finally, the electronic device determines the loss of the gaze correction model based on the reconstruction loss, the feature loss, and the generative adversarial loss. For example, the above reconstruction loss Reconstruction_loss, feature loss LPIPS loss, and generative adversarial loss (including the discriminant network loss D_loss and the generative network loss G_loss) may be directly summed or weighted-summed to obtain the loss of the gaze correction model to-be-trained.

In the embodiments of the disclosure, the loss of the gaze correction model to-be-trained further includes a gaze estimation loss. As shown in FIG. 9, after the corrected eye image sample 96 is obtained, the electronic device performs gaze estimation on the corrected eye image sample 96 to obtain a gaze direction (θ1', θ2') of the corrected eye image sample 96; and determines a gaze estimation loss based on the gaze direction of the corrected eye image sample and the target gaze direction. The gaze estimation is performed on the corrected eye image sample to obtain the gaze direction of the corrected eye image sample, which may be achieved by pre-training a neural network with gaze estimation capability.

In the embodiments of the disclosure, the gaze estimation loss Gaze_loss may be expressed by formula (5); Formula (5) is shown below.

$$Gaze\_loss=\|\theta1'-\theta1\|+\|\theta2'-\theta2\| \quad (5);$$

where (θ1', θ2') represents the estimated gaze direction of the corrected eye image sample, and (θ1, θ2) represents the target gaze direction. Then, the electronic device determines the loss of the gaze correction model to-be-trained based on the gaze estimation loss Gaze_loss, the reconstruction loss Reconstruction_loss, the feature loss LPIPS_loss, the discriminant network loss D_loss, and the generative network loss G_loss. For example, the loss of the gaze correction model to-be-trained may be expressed by formula (6); Formula (6) is shown below.

$$loss=Gaze\_loss+Reconstruction\_loss+LPIPS\_loss+D\_loss+G\_loss \quad (6).$$

In the embodiments of the disclosure, when calculating the loss of the gaze correction model to-be-trained, the electronic device may also perform the calculation in a weighted summation manner, which is not limited in the embodiments of the disclosure.

It should be noted that after the electronic device completes the training of the gaze correction model to-be-trained and obtains the gaze correction model, in the process of using the gaze correction model, only a trained first encoding network to-be-trained may be used as the encoding network, and a trained second encoding network to-be-trained is not required.

In the method for training a gaze correction model according to the embodiments of the disclosure, during the training of the gaze correction model to-be-trained, the two images, that is, the eye image sample to-be-corrected and the target corrected eye image, contained in each training sample have a difference in ambient noise such as light. The embodiments of the disclosure, during learning of the encoder, decouple the feature information into the specific eye expression feature, the eye expression feature sample, and the environment-related feature sample, and input the target environmental feature corresponding to the target corrected eye image to the decoding network to-be-trained, which may reduce the interference caused by the ambient noise, and improve the robustness of the final gaze correction model obtained by training, thereby improving the accuracy of the gaze correction.

During the calculation of the loss of the gaze correction model to-be-trained, losses in various aspects, such as the reconstruction loss, the feature loss, the generative adversarial loss, and the gaze estimation loss, are introduced so that the efficiency and accuracy of the parameter adjustment of the gaze correction model to-be-trained are high, thereby improving the efficiency of obtaining the gaze correction model.

Figure 10:
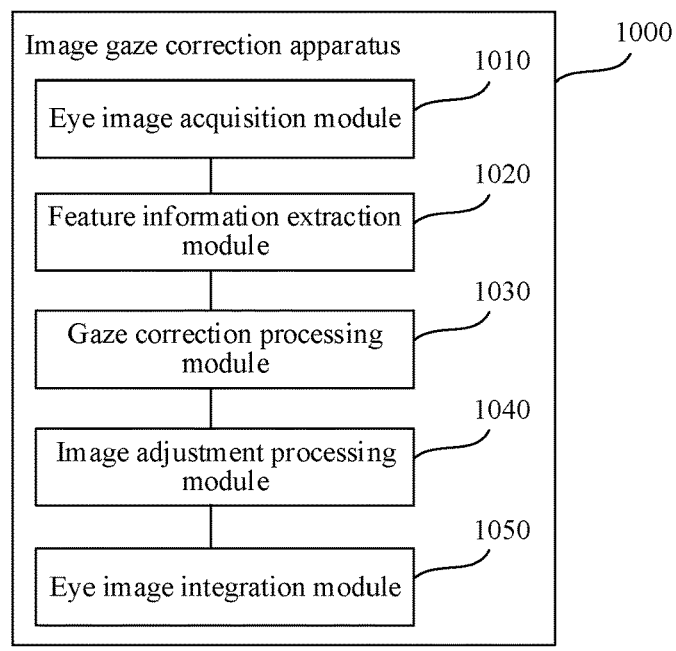
FIG. 10 is a block diagram of an image gaze correction apparatus according to an embodiment of the disclosure.

FIG. 10 is a block diagram of an image gaze correction apparatus according to an embodiment of the disclosure. The image gaze correction includes a function for implementing the image gaze correction method according to the embodiments of the disclosure, and the function may be implemented by hardware, or by hardware executing corresponding software. The device may be an electronic device such as a computer device, or may be disposed in an electronic device such as a computer device. The image gaze correction apparatus 1000 may include: an eye image acquisition module 1010, a feature information extraction module 1020, a gaze correction processing module 1030, an image adjustment processing module 1040, and an eye image integration module 1050.

The eye image acquisition module 1010 is configured to acquire an eye image to-be-corrected from an image to-be-corrected.

The feature information extraction module 1020 is configured to perform feature extraction processing on the eye image to-be-corrected to obtain feature information of the eye image to-be-corrected.

The gaze correction processing module 1030 is configured to perform, based on the feature information and a target gaze direction, gaze correction processing on the eye image to-be-corrected to obtain an initially corrected eye image and an eye contour mask, the target gaze direction referring to a gaze direction to which an eye gaze in the eye image to-be-corrected is to be corrected, and the eye contour mask being used for indicating a probability that a pixel position in the eye image to-be-corrected belongs to an eye region.

The image adjustment processing module 1040 is configured to perform, by using the eye contour mask, adjustment processing on the initially corrected eye image to obtain a corrected eye image.

The eye image integration module 1050 is configured to generate a gaze corrected human face image based on the corrected eye image.

In the embodiments of the disclosure, the feature information extraction module 1020 is further configured to perform feature extraction processing on the eye image to-be-corrected to obtain an eye expression feature, an eye texture feature, and an environmental feature; and determine the specific eye expression feature, the eye texture feature, and the environment-related feature as the feature information.

In the embodiments of the disclosure, the gaze correction processing module 1030 is further configured to combine the feature information and the target gaze direction in a channel dimension to obtain combined data; and perform, based on a feature dimension of the eye image to-be-corrected, feature reconstruction on the combined data to obtain the initially corrected eye image and the eye contour mask.

In the embodiments of the disclosure, the image adjustment processing module 1040 is further configured to fuse pixel values of corresponding positions in the eye contour mask and the initially corrected eye image to obtain a first intermediate image; fuse pixel values of corresponding positions in a mapped image corresponding to the eye contour mask and the eye image to-be-corrected to obtain a second intermediate image; and integrate pixel values of corresponding positions in the first intermediate image and the second intermediate image to obtain the corrected eye image.

In the embodiments of the disclosure, the eye image integration module 1050 is further configured to integrate the corrected eye image into an image capture frame position of the image to-be-corrected to obtain an integrated image, where the image capture frame position is a position of the eye image to-be-corrected in the image to-be-corrected; and perform image harmonization processing at the image capture frame position in the integrated image to obtain the gaze corrected image, where the image harmonization process is used for eliminating boundary traces at the image capture frame position.

In the embodiments of the disclosure, both the feature extraction processing and the gaze correction processing are implemented by a gaze correction model, where the gaze correction model includes an encoding network and a decoding network, the encoding network is used for performing the feature extraction processing, and the decoding network is used for performing the gaze correction processing.

Figure 11:
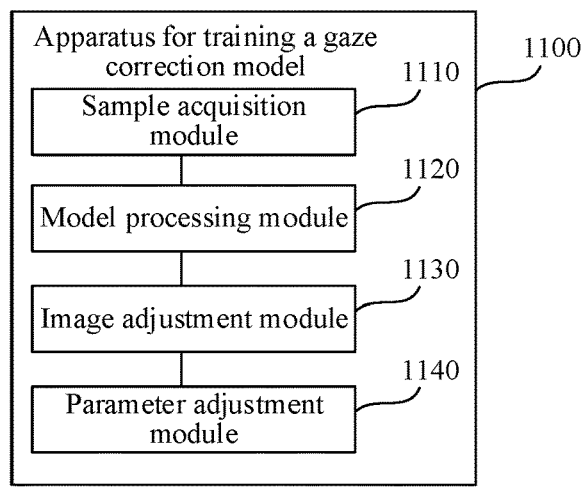
FIG. 11 is a block diagram of an apparatus for training a gaze correction model according to an embodiment of the disclosure.

FIG. 11 is a block diagram of an apparatus for training a gaze correction model according to an embodiment of the disclosure. The apparatus for training a gaze correction model includes a function of implementing the method for training a gaze correction model according to the embodiments of the disclosure, and the function may be implemented by hardware or by hardware executing corresponding software. The apparatus for training a gaze correction model may be an electronic device such as a computer device, or may be disposed in an electronic device such as a computer device. The apparatus 1100 for training a gaze correction model may include: a sample acquisition module 1110, a model processing module 1120, an image adjustment module 1130, and a parameter adjustment module 1140.

The sample acquisition module 1110 is configured to acquire a training sample of the gaze correction model to-be-trained, the training sample including an eye image sample to-be-corrected and a target corrected eye image.

The model processing module 1120 is configured to perform, by the gaze correction model to-be-trained, gaze correction processing on the eye image sample to-be-corrected, the target corrected eye image, and a target gaze direction sample to obtain an initially corrected eye image sample and an eye contour mask sample, the target gaze direction sample referring to a gaze direction to which an eye gaze in the eye image sample to-be-corrected is to be corrected, and the eye contour mask sample being used for indicating a probability that a pixel position in the eye image sample to-be-corrected belongs to an eye region.

The image adjustment module 1130 is configured to perform, by using the eye contour mask sample, adjustment processing on the initially corrected eye image sample to obtain a corrected eye image sample.

The parameter adjustment module 1140 is configured to determine, based on the corrected eye image sample and the target corrected eye image, a loss of the gaze correction model to-be-trained, and adjust a parameter of the gaze correction model to-be-trained based on the loss to obtain a gaze correction model.

In the embodiments of the disclosure, the gaze correction model to-be-trained includes a first encoding network to-be-trained, a second encoding network to-be-trained, and a decoding network to-be-trained. The model processing module 1120 is configured to perform, by the first encoding network to-be-trained, feature extraction processing on the eye image sample to-be-corrected to obtain an eye expression feature sample and an eye texture feature sample; perform, by the second encoding network to-be-trained, feature extraction processing on the target corrected eye image to obtain a target environmental feature; and perform, by the decoding network to-be-trained, gaze correction processing on the eye expression feature sample, the eye expression irrelevant feature, the target environmental feature, and the target gaze direction sample to obtain the initially corrected eye image sample and the eye contour mask sample.

In the embodiments of the disclosure, the parameter adjustment module 1140 is further configured to determine a reconstruction loss based on a pixel difference between the corrected eye image sample and the target corrected eye image; determine a feature loss based on an image feature difference between the corrected eye image sample and the target corrected eye image; determine a generative adversarial loss between the corrected eye image sample and the target corrected eye image; and determine the loss of the gaze correction model based on the reconstruction loss, the feature loss, and the generative adversarial loss.

In the embodiments of the disclosure, the parameter adjustment module 1140 is further configured to output, by a feature loss calculation model, a learned perceptual image patch similarity (LPIPS) loss between the corrected eye image sample and the target corrected eye image, where the feature loss includes the LPIPS loss.

In the embodiments of the disclosure, the parameter adjustment module 1140 is further configured to determine a generative network loss and a discriminant network loss based on a discrimination result of a multi-scale discriminator on the corrected eye image sample and the target corrected eye image; and determine the generative network loss and the discriminant network loss as the generative adversarial loss.

In the embodiments of the disclosure, the parameter adjustment module 1140 is further configured to perform gaze estimation on the corrected eye image sample to obtain a gaze direction of the corrected eye image sample; and determine a gaze estimation loss based on the gaze direction of the corrected eye image sample and the target gaze direction sample.

In the embodiments of the disclosure, the parameter adjustment module 1140 is further configured to determine the loss of the gaze correction model to-be-trained based on the gaze estimation loss, the reconstruction loss, the feature loss, and the generative adversarial loss.

It should be noted that when the image gaze correction apparatus and the apparatus for training a gaze correction model according to the embodiments of the disclosure implement functions, only division of the present application function modules is used as an example for description. In the practical application, the functions may be assigned to and completed by different functional modules according to the requirements. That is, an internal structure of the electronic device is divided into different functional modules, to implement all or some of the functions described above. In addition, the image gaze correction apparatus and the apparatus for training a gaze correction model according to the embodiments of the disclosure belong to the same inventive concept as the image gaze correction method and the method for training a gaze correction model according to the embodiments of the disclosure.

Figure 12:
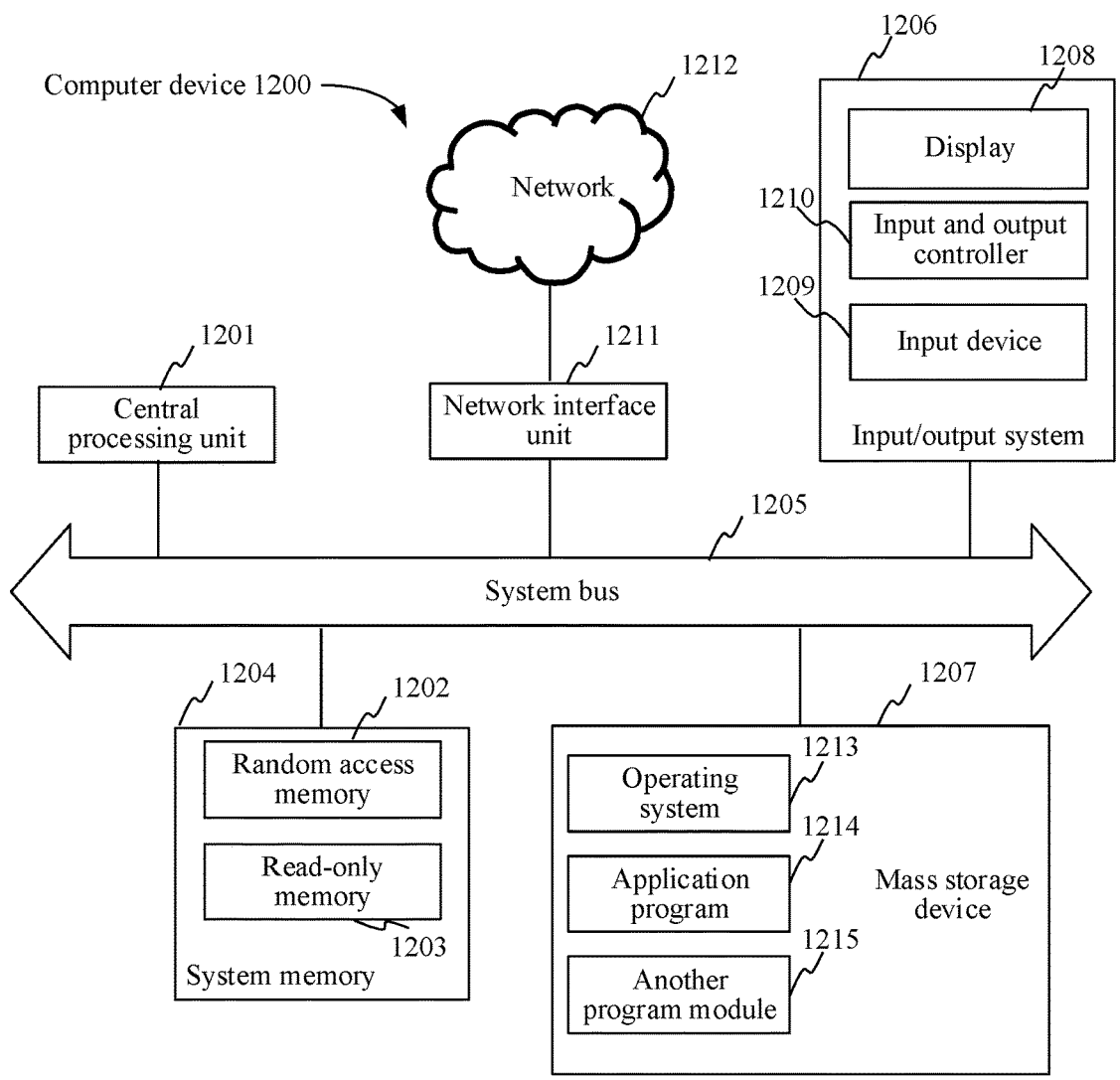
FIG. 12 is a schematic structural diagram of a computer device according to an embodiment of the disclosure.

FIG. 12 is a schematic structural diagram of a computer device according to an embodiment of the disclosure. The computer device may be any electronic device with a data computing function, a data processing function and a data storage function such as a mobile phone, a tablet computer, PC or a server. The computer device is configured to perform the image gaze correction method for a human face, or the method for training a gaze correction model according to the foregoing embodiments. Specifically, The computer device 1200 includes a central processing unit (such as a central processing unit (CPU), a graphics processing unit (GPU), a field programmable gate array (FPGA) or the like) 1201, a random access memory (RAM) 1202, a system memory 1204 of a read only memory (ROM) 1203, and a system bus 1205 connecting the system memory 1204 to the CPU 1201. The computer device 1200 further includes a basic input/output (I/O system) 1206 assisting in transmitting information between devices in a server, and a mass storage device 1207 configured to store an operating system 1213, an application program 1214 and another program module 1215.

The basic I/O system 1206 includes a display 1208 configured to display information, and an input device 1209 configured to input information by a user, such as a mouse and a keyboard. The display 1208 and the input device 1209 are both connected to the CPU 1201 by using an input/output controller 1210 connected to the system bus 1205. The basic I/O system 1206 may further include the I/O controller 1210 configured to receive and process inputs from a plurality of other devices such as a keyboard, a mouse, or an electronic stylus. In the embodiments of the disclosure, the I/O controller 1210 further provides an output to a display screen, a printer, or another type of output device.

The mass storage device 1207 is connected to the CPU 1201 by using a mass storage controller (not shown) connected to the system bus 1205. The mass storage device 1207 and an associated computer-readable storage medium provide non-volatile storage for the computer device 1200. That is, the mass storage device 1207 may include a computer-readable storage medium (not shown in FIG. 12) such as a hard disk, or a compact disc read-only memory (CD-ROM) drive.

In the embodiments of the disclosure, the computer-readable storage medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer-readable storage medium includes a RAM, a ROM, an erasable programmable ROM (EPROM), an electrically erasable programmable ROM (EEPROM), a flash memory or another solid-state memory technology, CD-ROM, a high density digital video disc (DVD) or another optical memory, a magnetic cassette, a magnetic tape, a magnetic disk memory, or another readable magnetic storage device. Certainly, a person skilled in the art may know that the computer-readable storage medium is not limited to the foregoing several types. The system memory 1204 and the mass storage device 1207 may be collectively referred to as a memory.

According to the embodiments of the disclosure, the computer device 1200 may be further connected, through a network such as the Internet, to a remote computer on the network and run. That is, the computer device 1200 may be connected to a network 1212 by using a network interface unit 1211 connected to the system bus 1205, or may be connected to another type of network or a remote computer system (not shown in FIG. 12) by using a network interface unit 1211.

The memory further includes at least one instruction, at least one program, a code set, or an instruction set. The at least one instruction, the at least one program, the code set, or the instruction set is stored in the memory and is configured to be executed by one or more processors to implement the image gaze correction method, or the method for training a gaze correction model.

A computer-readable storage medium is provided in an embodiment of the disclosure, storing at least one instruction, at least one program, a code set, or an instruction set, and the at least one instruction. The at least one program, the code set, or the instruction set, when executed by a processor of a computer device, implements the image gaze correction method, or the method for training a gaze correction model according to the embodiments of the disclosure.

In the embodiment of the disclosure, the computer-readable storage medium may include: a ROM, a RAM, a solid state drive (SSD), an optical disc, or the like. The RAM may include a resistance random access memory (ReRAM) and a dynamic random access memory (DRAM).

A computer program product or a computer program is provided in an embodiment of the disclosure. The computer program product or the computer program includes computer instructions, and the computer instructions are stored in a computer-readable storage medium. A processor of a computer device (referred to as an electronic device) reads the computer instructions from the computer-readable storage medium, and executes the computer instructions, causing the computer device to perform the image gaze correction method, or the method for training a gaze correction model according to the embodiments of the disclosure.

It should be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in the embodiments of the disclosure merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of the disclosure.

The foregoing descriptions are merely exemplary embodiments of the disclosure, but are not intended to limit the disclosure. Any modification, equivalent replacement, and improvement made without departing from the spirit and principle of the disclosure shall fall within the protection scope of the disclosure.

What is claimed is:

1. An image gaze correction method, the method being performed by an electronic device, and the method comprising:
   acquiring an eye image from an image;
   performing feature extraction processing on the eye image to obtain feature information of the eye image;
   performing, based on the feature information and a target gaze direction, gaze correction processing on the eye image to obtain an initially corrected eye image and an eye contour mask, the target gaze direction being a gaze direction to which an eye gaze in the eye image is to be corrected, and a pixel value of each position in the eye contour mask having a value in a range from 0 to 1 indicating a probability that a corresponding pixel position in the eye image belongs to an eye region;
   performing, by using the eye contour mask, adjustment processing on the initially corrected eye image to obtain a corrected eye image; and
   generating a gaze corrected image based on the corrected eye image,
   wherein the performing the adjustment processing on the initially corrected eye image comprises:
   fusing pixel values of corresponding positions in the eye contour mask and the initially corrected eye image to obtain a first intermediate image;
   fusing pixel values of corresponding positions in a mapped image corresponding to the eye contour mask and the eye image to obtain a second intermediate image, wherein a pixel value of any position in the mapped image is a value obtained by subtracting a pixel value at a corresponding position in the eye contour mask from 1; and
   integrating pixel values of corresponding positions in the first intermediate image and the second intermediate image to obtain the corrected eye image.

2. The method according to claim 1, wherein the performing the feature extraction processing comprises:
   performing the feature extraction processing on the eye image to obtain an eye expression feature, an eye expression irrelevant feature, and an environment-related feature; and
   determining the eye expression feature, the eye expression irrelevant feature, and the environment-related feature as the feature information.

3. The method according to claim 1, wherein the performing the gaze correction processing comprises:
   combining the feature information and the target gaze direction in a channel dimension to obtain combined data; and
   performing, based on a feature dimension of the eye image, feature reconstruction on the combined data to obtain the initially corrected eye image and the eye contour mask.

4. The method according to claim 1, wherein the generating the gaze corrected image comprises:
   integrating the corrected eye image into an image capture frame position of the image to obtain an integrated image, wherein the image capture frame position is a position of the eye image in the image; and
   performing image harmonization processing to eliminate boundary traces at the image capture frame position in the integrated image, and obtaining the gaze corrected image based on a result of the image harmonization processing.

5. The method according to claim 1, wherein the feature extraction processing and the gaze correction processing are performed by using a gaze correction model, wherein the gaze correction model comprises an encoding network and a decoding network, the encoding network is configured to perform the feature extraction processing, and the decoding network is configured to perform the gaze correction processing.

6. The method according to claim 5, wherein the gaze correction model is trained by:
   acquiring a training sample for training the gaze correction model, the training sample comprising an eye image sample and a target corrected eye image;
   performing, by the gaze correction model, gaze correction processing on the eye image sample, the target corrected eye image, and a target gaze direction sample to obtain an initially corrected eye image sample and an eye contour mask sample, the target gaze direction sample being a gaze direction to which an eye gaze in the eye image sample is to be corrected, and a pixel value of each position in the eye contour mask having a value in a range from 0 to 1 indicating a probability that a corresponding pixel position in the eye image sample belongs to an eye region;
   performing, by using the eye contour mask sample, adjustment processing on the initially corrected eye image sample to obtain a corrected eye image sample; and
   determining, based on the corrected eye image sample and the target corrected eye image, a loss of the gaze correction model, and adjusting a parameter of the gaze correction model based on the loss to obtain the gaze correction model.

7. The method according to claim 6, wherein the gaze correction model comprises a first encoding network, a second encoding network, and a decoding network; and
   the performing, by the gaze correction model, the gaze correction processing comprises:
   performing, by the first encoding network, feature extraction processing on the eye image sample to obtain an eye expression feature sample and an eye expression irrelevant feature sample;

performing, by the second encoding network, feature extraction processing on the target corrected eye image to obtain a target environmental feature; and performing, by the decoding network, the gaze correction processing on the eye expression feature sample, the eye expression irrelevant feature sample, the target environmental feature, and the target gaze direction sample to obtain the initially corrected eye image sample and the eye contour mask sample.

8. The method according to claim 6, wherein the determining the loss of the gaze correction model comprises:

determining a reconstruction loss based on a pixel difference between the corrected eye image sample and the target corrected eye image;

determining a feature loss based on an image feature difference between the corrected eye image sample and the target corrected eye image;

determining a generative adversarial loss between the corrected eye image sample and the target corrected eye image; and determining the loss of the gaze correction model based on the reconstruction loss, the feature loss, and the generative adversarial loss.

9. The method according to claim 8, wherein the determining the feature loss based on the image feature difference between the corrected eye image sample and the target corrected eye image comprises:

outputting, by a feature loss calculation model, a learned perceptual image patch similarity (LPIPS) loss between the corrected eye image sample and the target corrected eye image, wherein the feature loss comprises the LPIPS loss.

10. The method according to claim 8, wherein the determining the generative adversarial loss between the corrected eye image sample and the target corrected eye image comprises:

determining a generative network loss and a discriminant network loss based on a discrimination result of a multi-scale discriminator on the corrected eye image sample and the target corrected eye image; and determining the generative network loss and the discriminant network loss as the generative adversarial loss.

11. The method according to claim 8, wherein the method further comprises:

performing gaze estimation on the corrected eye image sample to obtain a gaze direction of the corrected eye image sample; and determining a gaze estimation loss based on the gaze direction of the corrected eye image sample and the target gaze direction sample; and the determining the loss of the gaze correction model based on the reconstruction loss, the feature loss, and the generative adversarial loss comprises:

determining the loss of the gaze correction model based on the gaze estimation loss, the reconstruction loss, the feature loss, and the generative adversarial loss.

12. An electronic device, comprising a processor and a memory, the memory storing at least one instruction, at least one program, a code set, or an instruction set, the at least one instruction, the at least one program, the code set, or the instruction set being loaded and executed by the processor to perform the image gaze correction method including training the gaze correction model according to claim 6.

13. A non-transitory computer-readable storage medium, storing at least one instruction, at least one program, a code set, or an instruction set, and the at least one instruction, the at least one program, the code set, or the instruction set being loaded and executed by a processor to perform the image gaze correction method including training the gaze correction model according to claim 6.

14. The method according to claim 1, wherein the fusing the pixel values in each of obtaining the first intermediate image and the second intermediate image comprises multiplying the pixel values of the corresponding positions, and the integrating the pixel values comprises adding the pixel values of the corresponding positions in the first intermediate image and the second intermediate image.

15. An electronic device, comprising a processor and a memory, the memory storing at least one instruction, at least one program, a code set, or an instruction set, the at least one instruction, the at least one program, the code set, or the instruction set being loaded and executed by the processor to perform the image gaze correction method according to claim 1.

16. A non-transitory computer-readable storage medium, storing at least one instruction, at least one program, a code set, or an instruction set, and the at least one instruction, the at least one program, the code set, or the instruction set being loaded and executed by a processor to perform the image gaze correction method according to claim 1.

17. A human face image gaze correction apparatus, the apparatus comprising:

at least one memory configured to store program code; and at least one processor configured to read the program code and operate as instructed by the program code, the program code comprising:

eye image acquisition code configured to cause the at least one processor to acquire an eye image from an image;

feature information extraction code configured to cause the at least one processor to perform feature extraction processing on the eye image to obtain feature information of the eye image;

gaze correction processing code configured to cause the at least one processor to perform, based on the feature information and a target gaze direction, gaze correction processing on the eye image to obtain an initially corrected eye image and an eye contour mask, the target gaze direction being a gaze direction to which an eye gaze in the eye image is to be corrected, and a pixel value of each position in the eye contour mask having a value in a range from 0 to 1 indicating a probability that a corresponding pixel position in the eye image belongs to an eye region;

image adjustment processing code configured to cause the at least one processor to perform, by using the eye contour mask, adjustment processing on the initially corrected eye image to obtain a corrected eye image; and eye image integration code configured to cause the at least one processor to generate a gaze corrected image based on the corrected eye image, wherein the image adjustment processing code is configured to cause the at least one processor to perform the adjustment processing by:

fusing pixel values of corresponding positions in the eye contour mask and the initially corrected eye image to obtain a first intermediate image;

fusing pixel values of corresponding positions in a mapped image corresponding to the eye contour mask and the eye image to obtain a second intermediate image, wherein a pixel value of any position in the mapped image is a value obtained by subtracting a pixel value at a corresponding position in the eye contour mask from 1; and integrating pixel values of corresponding positions in the first intermediate image and the second intermediate image to obtain the corrected eye image.

18. The apparatus according to claim 17, wherein the feature information extraction code is configured to cause the at least one processor to perform the feature extraction processing on the eye image to obtain an eye expression feature, an eye expression irrelevant feature, and an environment-related feature; and determine the eye expression feature, the eye expression irrelevant feature, and the environment-related feature as the feature information.

19. The apparatus according to claim 17, wherein the gaze correction processing code is configured to cause the least one processor to combine the feature information and the target gaze direction in a channel dimension to obtain combined data; and perform, based on a feature dimension of the eye image, feature reconstruction on the combined data to obtain the initially corrected eye image and the eye contour mask.

* * * * *